Jan. 19, 1932.  J. W. SMITH  1,841,920
METHOD AND APPARATUS FOR FORMING INDIVIDUAL SHAPES
Filed Nov. 13, 1924  6 Sheets-Sheet 1
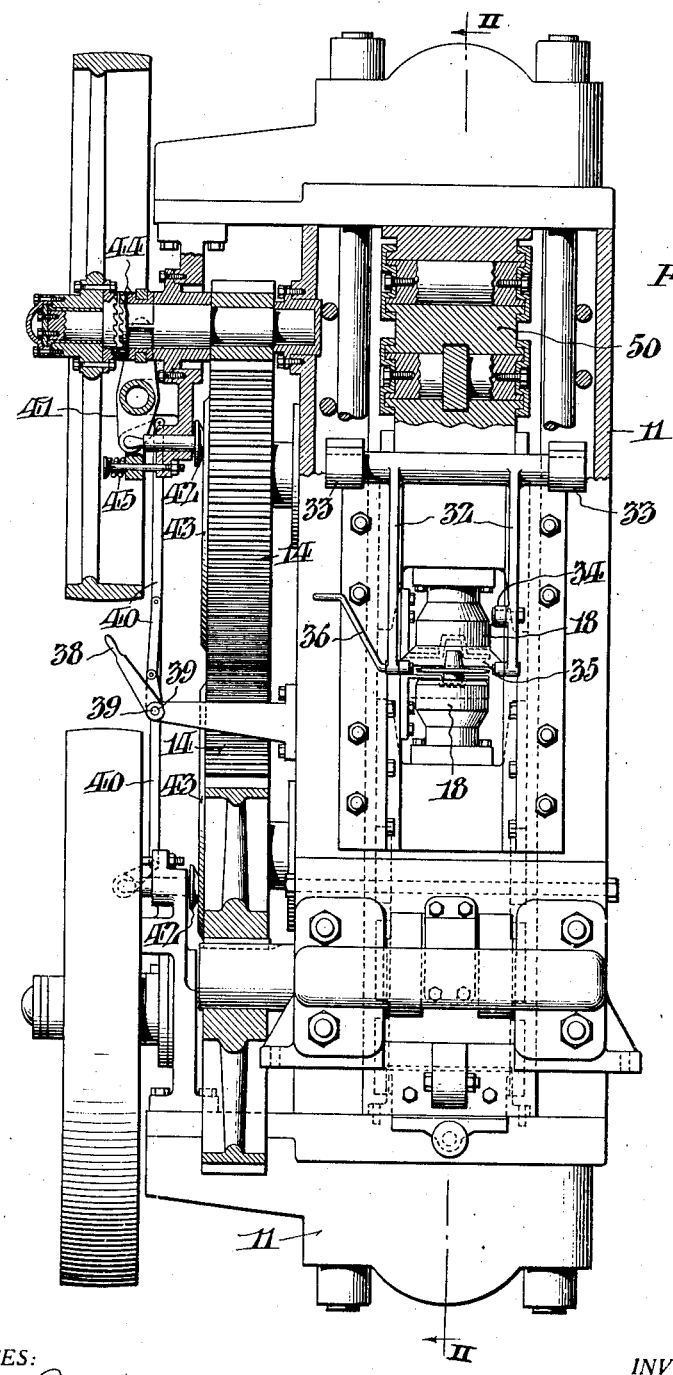
FIG. I.
WITNESSES:
Alfred E. Ischinger
Thomas W. Kerr, Jr.
INVENTOR:
John W. Smith,
BY Fralley Paul
ATTORNEYS.

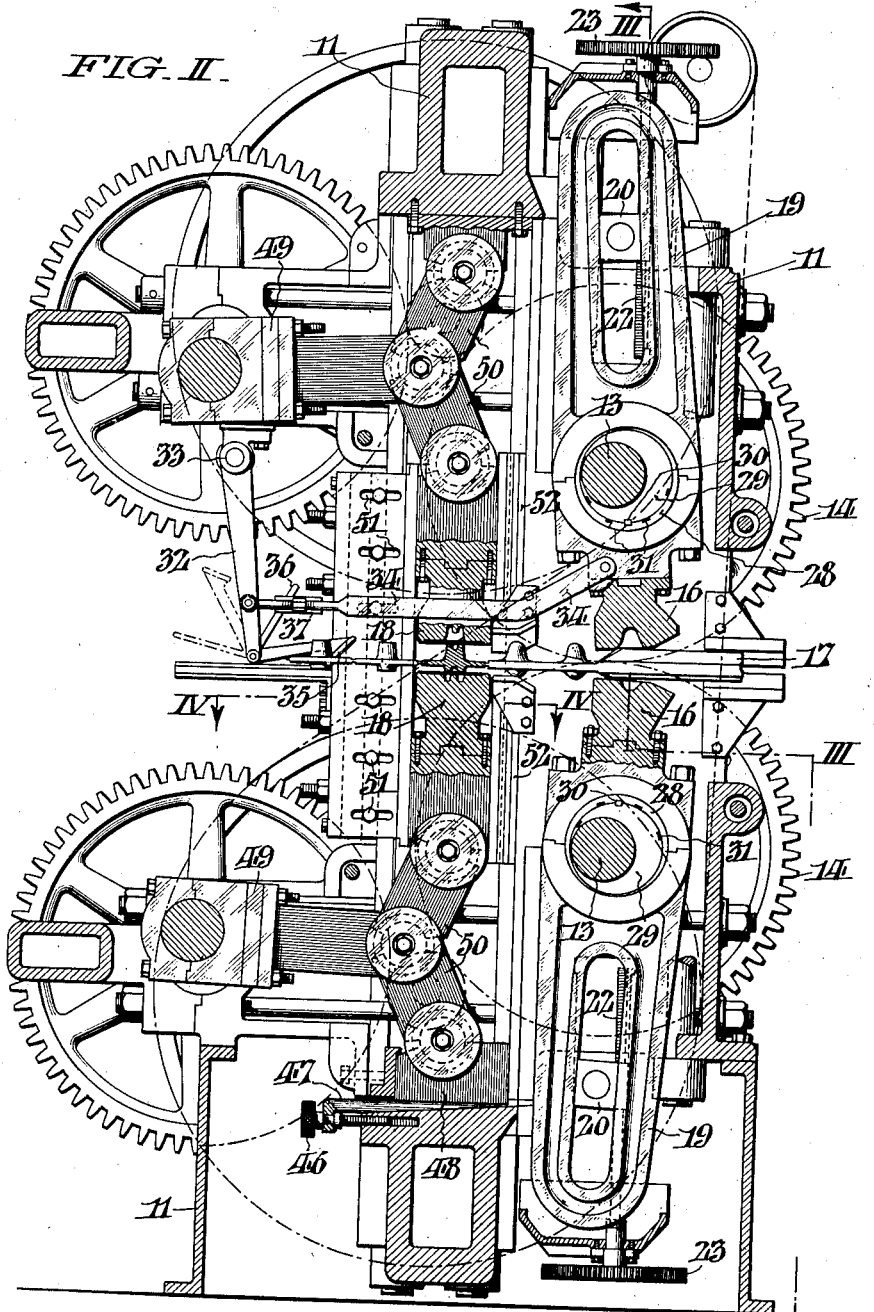

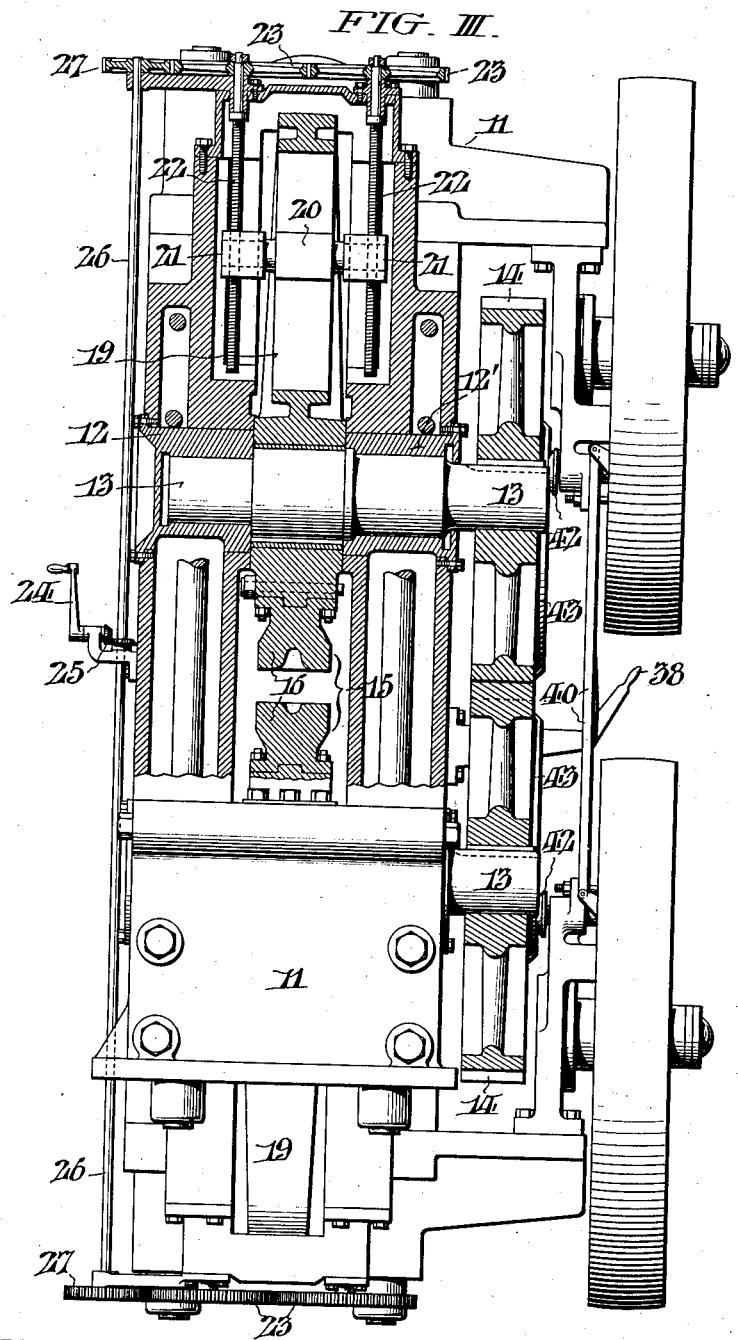

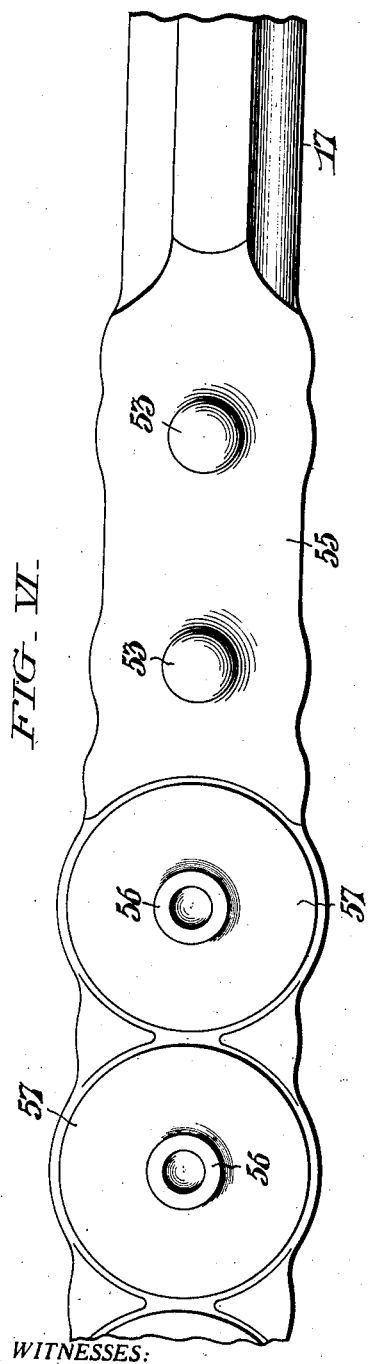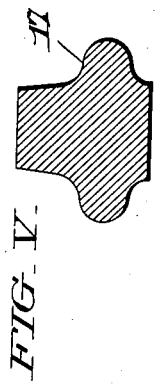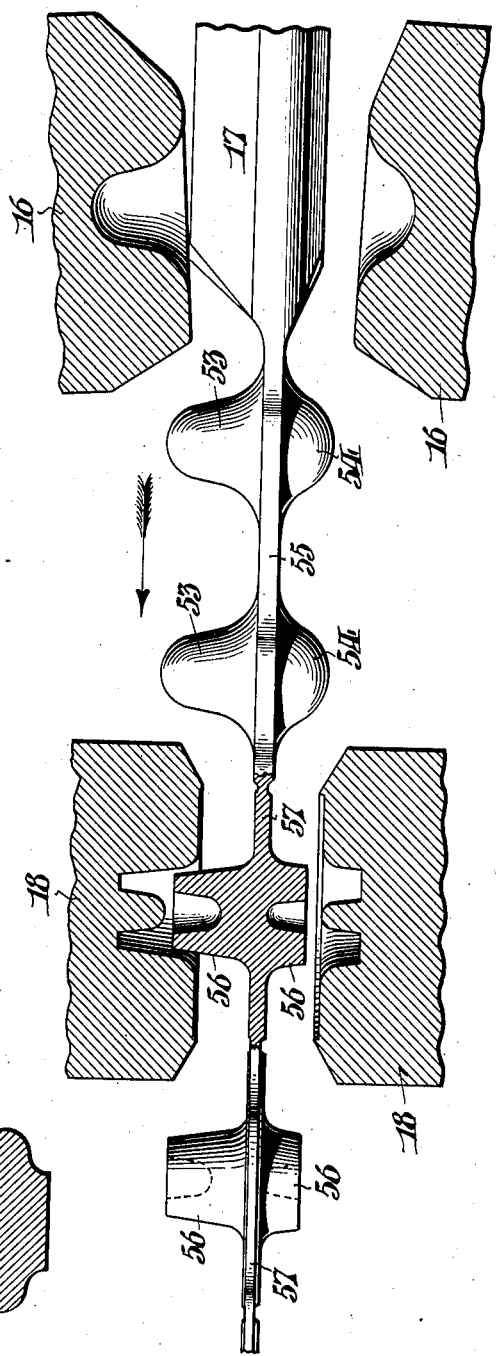

Jan. 19, 1932.  J. W. SMITH  1,841,920
METHOD AND APPARATUS FOR FORMING INDIVIDUAL SHAPES
Filed Nov. 13, 1924  6 Sheets-Sheet 5
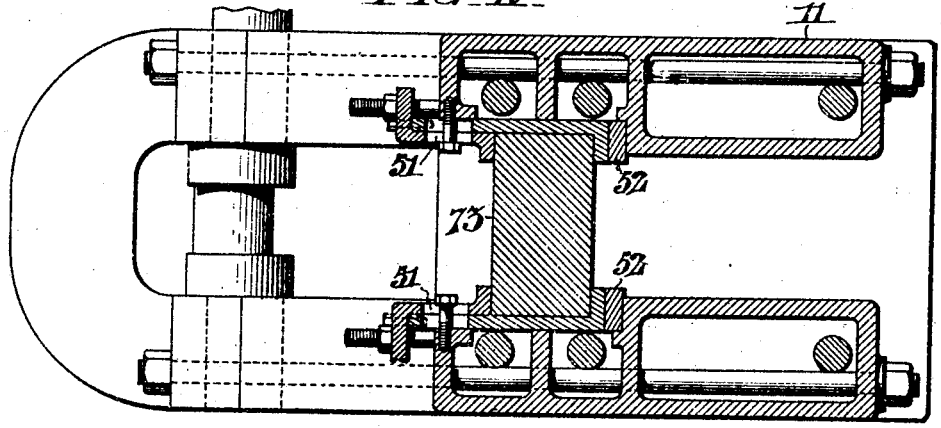
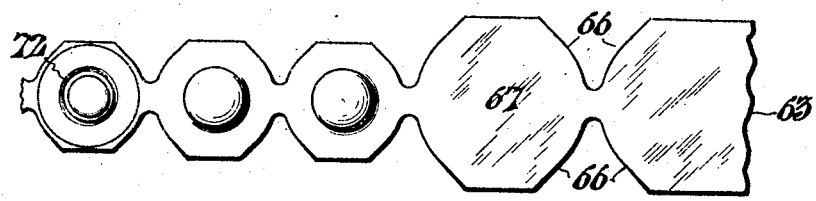
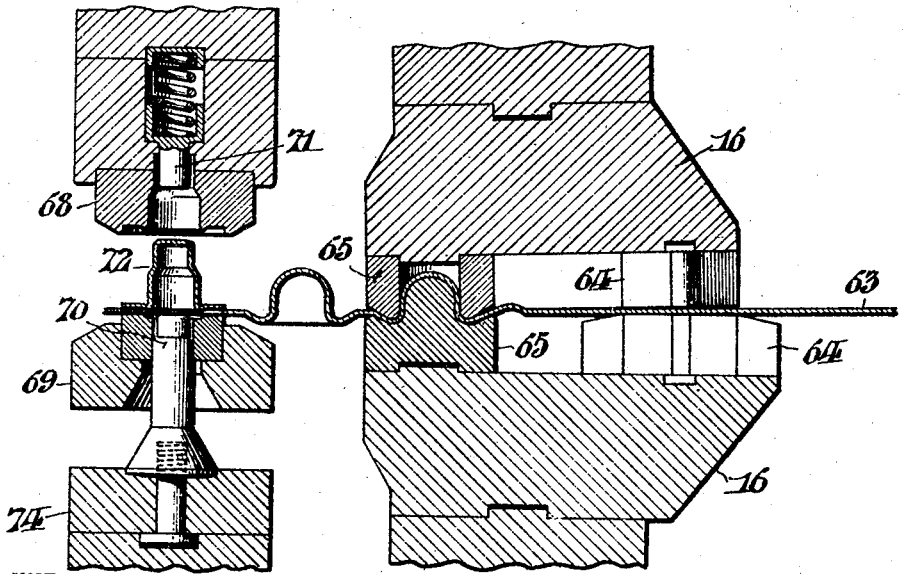
WITNESSES:
Alfred E. Ischinger
Thomas W. Kerr, Jr.
INVENTOR:
John W. Smith,
BY Fraley Paul
ATTORNEYS.

Jan. 19, 1932. J. W. SMITH 1,841,920
METHOD AND APPARATUS FOR FORMING INDIVIDUAL SHAPES
Filed Nov. 13, 1924 6 Sheets-Sheet 6
FIG. VIII.
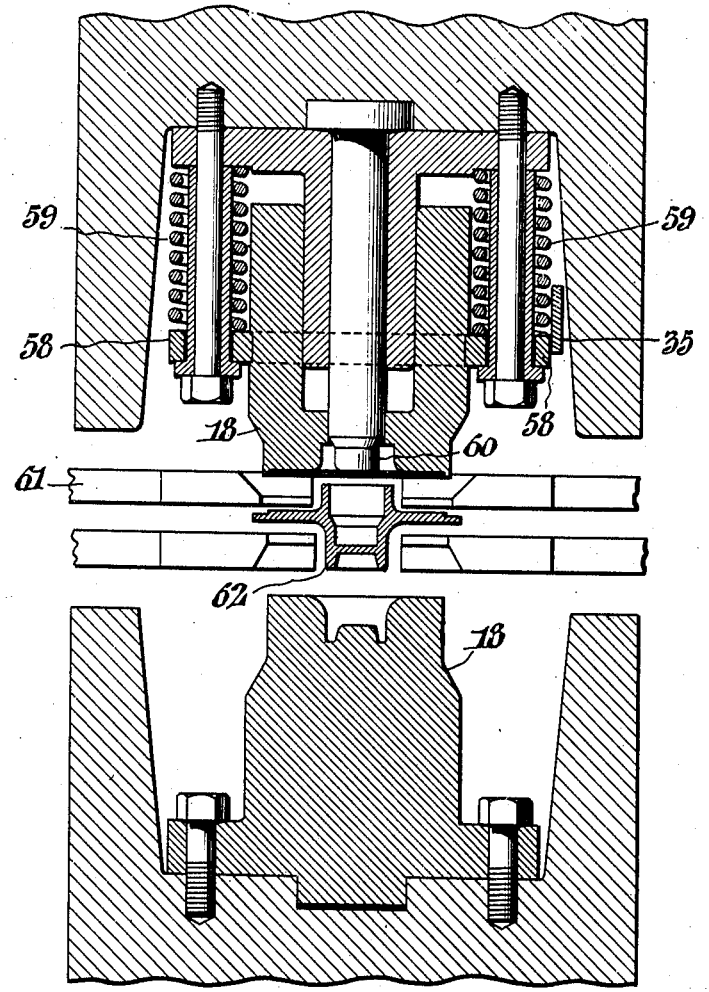
INVENTOR:
John W. Smith, Patented Jan. 19, 1932

1,841,920

UNITED STATES PATENT OFFICE

JOHN W. SMITH, OF PHILADELPHIA, PENNSYLVANIA

METHOD AND APPARATUS FOR FORMING INDIVIDUAL SHAPES

Application filed November 13, 1924. Serial No. 749,667.

This invention relates to a method and apparatus for hot forging or forming individual shapes from the comparatively long bar or strip material having a predetermined cross-sectional configuration and area best suited to the article forged or shaped. The various types and shapes of articles producable by my novel process and apparatus are numerous and hereinafter only a typical example will be explained.

The primary object of my invention is to provide a method and apparatus for forging or shaping individual articles by a continuous process in which at least one set of die-heads is actuated by what I term as a combination formative-spacing movement. The novel die-head may be constructed and adapted for forging or shaping, and for partly separating—or completely separating—the article from the bar when desirable. Incidentally, I designate the novel function involved in my method as "formative-spacing" to positively differentiate the fundamental distinction thereof over known methods of producing individual shapes, in that the hitherto consecutive operations of "forming" and "spacing or progressing", are concurrently effected by me with a unitary or single movement.

My novel method of producing individual forgings or shapes from bar or strip material of proper cross-sectional area and shape in most cases consists in heating the bar or strip to the desired temperature in a suitable furnace—preferably a progressive heating furnace—in which a mechanical means is employed to push or otherwise move the bars or strips through the furnace in a longitudinal direction. The forging machine is set adjacent to the furnace in line with the bar or strip, so that a progressive movement through the furnace of the heated bars or strips may cause one end to be properly located under the combination formative spacing die-head while the machine is not in motion. On proper location of the bar, the machine is started—to effect the process—by moving the control handle for setting said machine in motion.

A convenient location for the machine when operating on heated bars is about ten feet from the furnace door, if it is desirable to use bars over ten feet long, the entire length over and above said dimension would still remain in the furnace while the process of forging is taking place on the end outside thereof.

In some cases it is desirable to make metal shapes without preheating the metal, and a typical apparatus or machine therefor is illustrated in the accompanying drawings, said machine being adapted for the production of metal hubs for automobiles and other vehicles.

In the drawings, Fig. I, is a front end elevation of a machine conveniently adapted for the production of metal hubs in accordance with this invention, parts being broken away or in section to better disclose certain underlying features.

Fig. II, is a vertical longitudinal section taken approximately on the line II—II in the preceding figure.

Fig. III, is a staggered sectional elevation taken substantially as indicated by the line III—III in Fig. II.

Fig. IV, is a sectional plan—to an enlarged scale—taken approximately as indicated by the lines IV—IV in Fig. II.

Fig. V, is a typical section of bar or billet convenient for the production of metal hubs by the mechanisms illustrated in the preceding views.

Fig. VI, is a plan view of the car or billet in various stages of progressive treatments.

Fig. VII, is a part sectional elevation—or view at right angles to the preceding figure—with fragmentary portions of certain cooperative typical instrumentalities effective for the forming of metal hubs in accordance with my novel process.

Fig. VIII, is a fragmentary sectional elevation of a modified type of forming die-head and stripper-means, hereinafter more particularly explained.

Fig. IX, is a plan view exemplifying the adaptation of my invention to the forming of a different type of vehicle hub from strip metal; and, Fig. X, is a sectional elevation illustrating the co-operative instrumentalities employed for the formation of the individual shapes shown in the preceding figure.

Referring to the drawings, more in detail, it is to be explicitly understood the same are only by way of illustrating typical means effective for the successful carrying out of my invention; accordingly the following description will be of a somewhat general character and by way of briefly acquainting those skilled in the art as to a convenient means for carrying said invention into practical effect.

According to the embodiment of my invention illustrated the framework of the machine is comprehensively designated by the numeral 11, and it will be observed that it is provided with appropriate sleeve bearings 12, 12' for spaced crank shafts 13, 13. These crank shafts 13, 13 are co-ordinated by gears 14, 14 and they are functional to actuate a combination formative spacing die, comprehensively designated by the numeral 15. This combination die 15 forces the die-heads 16, 16 into the bar or stock 17, being operated on, while at the same time advancing said bar in a forward direction, equal to the distance required, to properly register a preformed blank between the finishing dies 18, 18. The combination die-heads 16, are removably secured to the adjacent ends of walking beams 19, slidable relative to crossheads 20 which are mounted in trunnion bearings 21 through which are threaded axially aligned adjusting screws 22, co-ordinated by toothed gears 23 rotatable in unison through the medium of a crank handle 24, bevel gears 25, shaft 26 and suitable gears 27, thereby controlling the position of the crossheads 20, to decrease or increase the space between each successive blank or shape, as later on further explained. The chief advantage of the just described spacing means is to make corrections in spacing during the process of forging without stopping the machine. Hereinafter, and in the claims, the expression "walking" is to be broadly interpreted as defining an oscillatory member or members having capacity for concurrent reciprocation relative to the axis of oscillation in order to differentiate over means capable of direct oscillation or reciprocation only.

An additional means for shortening or lengthening the spacing stroke of the die-heads 16, 16 is afforded by the use of eccentric sleeves 28 about the cranked portions 29 of the crank shafts 13 where they are journaled in the walking beams 19, aforesaid; said sleeves being retained at the required adjustment by means of keys 30. Thus it will be readily apparent that the throw of the cranked portions 29 may be easily varied by shifting the position of the eccentric sleeves 28 to the various slots 31. This latter adjustment is, however, only made use of when "setting-up" for the articles to be forged, or for new articles, and is rendered possible by firstly removing the sleeve bearing 12, hereinbefore referred to.

Rocker arms 32, fulcrumed at 33, receive motion through the medium of a link 34 connecting with the upper walking beam 19, for example, thereby causing an auxiliary feeding means or dog 35 to successively advance the finally blanked portions of the bar or stock 17 to the finishing dies 18. A handle 36 is provided to rock the dog 35, from active position, during the formative spacing periods of the die 15, as will be readily understood by an examination of Fig. II, more particularly, while adjustment of the link 34 to accommodate different spacing intervals is provided for by means of a turnbuckle 37 inserted therein. Adjustment of the link 34 may thus be accomplished during the operation of the machine.

Means for stopping the machine at any time comprise a control handle 38 fulcrumed at 39 and suitable linkages 40 that rock cams 41, which force plungers 42 against raised faces 43 on the gear wheels 14, 14 hereinbefore referred to, and thereby disengage the clutches 44. Relatively strong springs 45 influence the plungers 42 to effect an adequate frictional grip on the raised faces 43 to arrest rotation of the gear wheels 14, 14, after the clutches 44 are disengaged. The stopping mechanism just described is co-ordinated relative to die actuating means so as to effect arrest of the dies 15, and 18 substantially in the position best shown in Fig. II, regardless of when the operator moves the control handle 38; or, in other words, the machine is automatically brough to rest when said dies are receding from operative contact with the bar or stock 17.

A screw 46 is operative to move a wedge 47 functional for raising and lowering a toggle block 48 to regulate the thickness of the finished shape during the process of forging if desired. 49, 49 are replaceable shims for controlling the position of the toggles 50, 50 at the point of maximum pressure. Slots 51 and variable shims 52 are employed for regulating the distance between the finishing dies 18 and the combination formative spacing dies 15.

In setting up the machine for each individual article to be forged it is necessary firstly to estimate the number of blanks that will fill the space intervening the dies 15, 18 and then to adjust said distance accordingly by means of the slotted holes 51 and shims 52. The exact spacing is preferably set while the machine is in motion by manipulating the crank handle 24 hereinbefore described.

Referring now to Figs. V, VI and VII, it will be readily seen that the combined formative spacing die heads 16, 16 are operative upon the bar or stock 17 to produce upper and lower vertically axial tits 53, 54, respectively, with a continuous connecting web 55. Two such sets of tits 53, 54 are formed before the advancing set, that at the left hand in Fig. VII, is progressed into position below the finishing dies 18, 18 which form the cupped hubs 56 and intermediate surrounding flange 57 ready for boring and so forth.

In Fig. VIII, I have shown a different type of finishing dies 18, 18 the upper one whereof is resiliently supported by means of a collar 58 under the action of compression springs 59 whereby provision is made to withdraw the cupping punch 60 from the shape 62. Stripper plates or bars 61 are conveniently associated with the type of dies just described in order to prevent distortion of the finished shape 62 as the dies 18, 18 recede therefrom.

Figs. IX and X typify a further convenient assemblage of instrumentalities effective for the successful carrying out of my invention, and as more convenient for operation on a sheet strip 63. It will be observed that the initial die heads 16, 16 are fitted with spaced dies 64, 65, the former of which are in the nature of cutting members while the latter are functional as formers and contractors. The cutting dies 64, operate to remove opposed pieces of surplus metal as indicated at 66 in Fig. IX to form the initial blank 67; whereas the former-dies 65 function to both initially cup and contract said blank, as will be clearly appreciated by an examination of Fig. IX. The finishing dies 68, 69 illustrated in the referred to figures, it will be noted, are somewhat different from those hereinbefore described mainly on account of the different type of shape produced. However it is noteworthy that the cupping punch 70 is arranged to co-operate with a stripper plunger 71 in the upper die 68 on the upward movement of the former, and partly on its downward motion to prevent distortion of the finished shape 72 while being liberated from the dies. The finishing die 69 is mounted to the main guide 73, Fig. IV, of the machine and ensures a slight movement from the die block 74 to finish the forming operation. Stripper plates, not shown, may also be associated with the finishing dies 68, 69, as hereinbefore described, and as will be readily understood by those acquainted with the art. It will also be noted that the finishing operation upon the shape 72 further contracts the blank diametrically as clearly indicated at the left-hand end of Fig. IX.

The machine illustrated and described was designed with a capacity for operating upon circular shapes up to fourteen inches in diameter in single sequence, and in which one article is produced with each stroke of the dies 15, 18.

The normal speed of the machine illustrated is forty strokes per minute for articles of the class described, the same being an indicative example suitable for hot forging from a standpoint of speed. When operating the machine on hot forging it is desirable to forge the shapes at an efficient forging temperature before the metal is allowed to cool, therefore the speed of forging may be higher than forty strokes per minute in some cases and less in others.

To forge shapes at an efficient speed, the actual time in which the die 15 is in contact with the metal 17 during the initial process of shaping or forging is important, while the process of forging or working of the metal may be so rapid as to prevent an undesirable drop in temperature, and it may be comprehensively set forth as being accomplished in the following manner:

The initial period of operation is to simultaneously forge and space by advancing the bar or stock 17 the proper distance for the succeeding operation, thereby making it possible for a second die to perform an additional forging and finishing, or cutting operation, without any loss of time due to spacing. Thus it is possible to operate at a two fold higher speed by combining a feeding and forming process in one period of time. It will, of course, be readily understood that the die head 15 may be equipped with a combination means for performing more than one operation, simultaneously, as typically illustrated by Fig. X. An important advantage inhering to my invention is the two-fold process of speeding-up the time in which the die heads 16, 16 are in contact with the bar or stock 17 due to the concurrent actuation of both the upper and lower die heads.

Furthermore it must be clearly understood there may be a "drawing-up" of the metal during a part of the forging or forming process, and an expansion of the metal during some other portion of the process. At such periods the bar or strip 17, 63, respectively, must be free to expand or contract so as not to interfere with the forging and forming of the metal operated on.

The rocking motion imparted to the combination forging and feeding die-heads 16, 16 may be used to function as an additional element in the process. Thus it will be evident from the typical example illustrated that an interval is afforded in which the bar or strip 17, 63, is free to contract during each successive forming and spacing period, vide Figs. VII and X. At the end of the contraction period—as best evidenced in Fig. X—the rocking motion of the die heads 16 actuates the cutting dies 64, 64 which substantially separates the strip 63 into the individual blanks 67, as before set forth.

From the foregoing description it will be readily understood that the combination of movements and elements herein described provide a very rapid method and means of forging and spacing metal shapes, which may be employed for making various other articles than the species herein typified. Again it will be clearly appreciated that when commencing the process the heated bar 17 is firstly placed under the combination formative spacing die 15 in correct position for forming the first blank, whereupon the machine is started and allowed to run continuously until said bar is finished. In some cases one bar 17 may follow another thereby making the process continuous from bar to bar without stopping the machine. When it is desired to operate the machine on very long bars, it is preferable to stop said machine after completing work on each successive bar, and entering the new bar while the machine it as rest: whereas short bars may be fed therethrough without intermission, or continuously. Still further, when setting the machine or testing out new dies it is desirable to use a sample bar of lead or other soft material that may be conveniently worked cold. Finally, particular attention is directed to the provisions afforded for fine adjustments during hot forging, the same being effected while the machine is running, whereby considerable loss of time is avoided, general efficiency increased, and the output augmented.

From the foregoing it will be self evident that I have devised a novel and useful method and means which embody all the features and advantages enumerated as desirable in the statement of invention as well as the above description. Furthermore while I have, in the present instance, shown and explained a typical means for carrying out this invention which will ensure, in practice, satisfactory and reliable results, it is to be understood that considerable variations may be effected without departing from the spirit or scope thereof, much less sacrificing any of its advantages; accordingly the right is hereby reserved to make all such reasonable changes that are fairly circumscribed by the scope of the subjoined claim.

Having thus described my invention, I claim:

In a forging machine, opposed oscillatory crank-actuated die heads, fulcrumed for the purpose of simultaneously feeding and forming bar material into individual shapes, and a second die head of the non-feeding type adapted to perform an additional operation on the prepared blanks during the non-feeding period of the oscillatory die heads.

In testimony whereof, I have hereunto signed my name at Philadelphia, Pennsylvania, this 12th day of November, 1924.

JOHN W. SMITH.